2,791,025
SINTERED HARD METALS

Carl Ballhausen, Krefeld, and Heinz Schoelkens, Wachtendonk, Germany, assignors to Deutsche Edelstahlwerke Aktiengesellschaft, Krefeld, Germany Application September 11, 1952, Serial No. 309,148

Claims priority, application Germany September 14, 1951

2 Claims. (Cl. 29—182.7)

The invention relates to sintered hard metals consisting of hard carbides of the metals tungsten, molybdenum, vanadium, titanium, tantalum, columbium, singly or severally, bonded by a relatively low-melting point bonding metal, such as iron, nickel and/or cobalt. The bonding metal, which is also referred to as bonding agent phase or auxiliary metal phase, may be present in varying quantities. The larger the quantity of the bonding agent phase the tougher is the hard metal with reduced hardness and ability to retain cutting power or resistance to wear, and vice versa. In the known cutting alloys, the content of bonding metal is therefore generally from 3 to 18%, while for alloys in which wear alone is the criterion a content up to 30% of the total mass may be provided.

In the conventional hard metals, cobalt is generally employed as the bonding metal, and it has hitherto been considered advisable to employ a bonding metal of cobalt alone. A favourable general behavior of the sintered alloy is obtained by the partial solubility of the carbide, for example, the tungsten carbide which is the carbide frequently employed, in the bonding metal and the precipitation of carbide during cooling. These hard metals are sintered at temperatures from 1400 to 1450° and higher, because only then does the bonding metal, i. e., more especially cobalt, change into a molten state with the formation of a eutectic and permit a bonding of the pulverulent carbide particles with one another. Laboratory tests in connection with the sintering of hard metal of this type at temperatures of 1250° have shown that for practical purposes, intolerably long sintering times of eighty hours duration are necessary.

In contrast to the known art, it is proposed in accordance with the invention to produce the bonding material not from a pure metal, but to lower the melting point of the bonding material to less than 1300° by additions of metalloids and/or further metals. This makes it possible to work at lower temperatures and with lower power consumption and with a comparatively simple furnace arrangement. According to the composition of the bonding agent phase, sintering temperatures in the region of 1000° may be sufficient, and normal sintering times of about one hour or less are adequate.

The further metal and metalloid which are essentially added to the bonding metal, preferably cobalt, are chromium and boron and may amount to up to 40% of the bonding material. Silicon as a further metalloid may be added. Examples of the further metals that may be added are tungsten, molybdenum, vanadium, columbium, tantalum, titanium, aluminium, magnesium, copper, and these may be present singly or severally.

A sintered hard metal of which the bonding material consists of 5–25% chromium, 1.5–6% boron, the remainder cobalt, has proved to be particularly suitable. If such a bonding material is used in conjunction with tungsten carbide, it is possible to produce a final product having a high degree of toughness, outstanding resistance to wear and lasting cutting power, with a high total content of bonding material of, for example, 30% or more. The sintering temperatures are in the region of 1200° with the lowest alloyed materials and in the region of 1000° with the highest alloyed materials. A simplification of production and an improvement in the properties of the final body are obtained. Moreover it is possible, to a much greater extent than hitherto to adapt the properties of the product to particular uses by modifying the composition of the bonding material. An alloy with 78% tungsten carbide, 18% cobalt, 0.6% boron, and 3.4% chromium, sintered for one hour at 1000° has substantially the same cutting power as a conventional alloy consisting of 94% tungsten carbide and 6% cobalt.

This is surprising, since operating temperatures of 900–1000° are observable at the cutting edge of a tool and thus it would not be expected that a hard metal sintered at 1000° would withstand the stresses involved. Apparently, this is to be attributed to a small tendency of the improved bonding material to form a built-up cutting edge. Accordingly, the alloys according to the invention also have outstanding wear properties; for they do not tend to compress.

The inclusion of boron or silicon in the bonding material can be carried out by adding borides or silicides to the powder batch and the further metals may be incorporated by employing a boride or silicide of the desired metal, e. g., chromium boride or the like. It is also possible to employ initial alloys, as is frequently done in powder metallurgy. For example, initial aluminium alloys consisting of one-half of aluminium and one-half of one or more other metals such as cobalt have proved satisfactory, because these alloys are adapted to be converted comparatively easily into the powder form.

A further advantage of the sintered hard metal alloy according to the invention is that, in contrast to the known hard metal alloys, it is possible to produce a union with a steel carrier without the use of soldering agents or the like. The alloys according to the invention can be sintered firmly to steel at temperatures which do not injure the steel. Hard metal tools, such as chip-removing tools, dies or the like, and other articles which are given a hard metal lining or coating for wear resistance, can therefore be formed of a support, mount or the like of steel or iron and a surface of hard metal according to the invention sintered thereon. A previously sintered hard metal plate may be laid on a steel carrier, with intermediate scattering of a powder of the alloy, if desired, and heat and pressure applied to effect a union. Or an unsintered stamping can be sintered to the steel directly. The steel carrier or mount for example, for a drawing die, may be produced by the sintering method, the hard metal being simultaneously sintered-on at one stage of the operation. The hard metal according to the invention is therefore advantageous in the final working to form of the actual tool or the part subjected to wear, these advantages not being exhibited by the known hard metals which do not lend themselves to such sintered union.

Known hard metals can be hot-pressed to obtain a dense structure. Hard metals according to the invention are adapted to undergo hot-pressing with particularly good results. Hot pressing may be employed not only in the manufacture of the individual hard metal plates, but also to produce the union, by a sintering operation, between the hard metal and a carrier or mount of steel. Since the hard metal alloys have a lower coefficient of expansion than steel, hard metal and steel may be united by the simple hot-pressing process or even in the furnace, if the hard metal is pressed onto the steel or into a steel casing. Stresses occur when hot-pressing on to a steel surface but if high-frequency heating is employed and suitable precautions are taken so that the steel support is only brought to the sintering temperature at the surface where the union is to be made, it is possible for these stresses to be avoided or lessened.

The temperatures referred to herein and in the claims hereof are of the centigrade scale.

What we claim is:

1. Sintered hard metal comprising principally particles of at least one preformed hard carbide selected from the group consisting of the carbides of tungsten, molybdenum, vanadium, titanium, tantalum and columbium, said particles of the hard carbide alone each being surrounded and bonded together by a bonding medium, said bonding medium consisting essentially of (a) cobalt and (b) chromium boride, the chromium being present in an amount from 5 to 25% and the boron in an amount from 1.5 to 6.0% of the bonding medium.

2. Sintered hard metal comprising principally particles of at least one preformed hard carbide selected from the group consisting of the carbides of tungsten, molybdenum, vanadium, titanium, tantalum and columbium preformed hard carbide said particles of the hard carbide alone each being surrounded and bonded together by a bonding medium, said medium consisting essentially of (a) at least one metal selected from the group consisting of iron, cobalt and nickel and (b) chromium boride, the chromium being present in an amount from 5 to 25% and the boron in an amount of from 1.5 to 6.0% of the said bonding medium.

References Cited in the file of this patent
UNITED STATES PATENTS

| | | |
|---|---|---|
| 1,896,853 | Taylor | Feb. 7, 1933 |
| 1,904,568 | Taylor | Apr. 18, 1933 |
| 1,910,884 | Comstock | May 23, 1933 |
| 2,076,952 | Kratky | Apr. 13, 1937 |
| 2,084,349 | Laise | June 22, 1937 |
| 2,120,562 | Laise | June 14, 1938 |
| 2,121,448 | Ritzau | June 21, 1938 |
| 2,191,666 | Kieffer | Feb. 27, 1940 |
| 2,726,153 | Ballhausen | Dec. 6, 1955 |